United States Patent [19]

Ohama et al.

[11] 4,052,712
[45] Oct. 4, 1977

[54] APPARATUS FOR PHOTOGRAPHING ROAD RUTS

[75] Inventors: Masanori Ohama, Machida; Yutaka Nakada, Soka, both of Japan

[73] Assignee: Pacific Kogyo Kabushiki Kaisha, Tokyo, Japan

[21] Appl. No.: 577,007

[22] Filed: May 13, 1975

[51] Int. Cl.² ............................................. G01D 9/42
[52] U.S. Cl. ................................. 346/107 R; 354/81; 354/126
[58] Field of Search ........................ 354/75–77, 354/80, 81, 126, 354; 346/107 R

[56] References Cited

U.S. PATENT DOCUMENTS

| 1,382,978 | 6/1921 | Hopkins ............................ 354/75 X |
| 2,163,124 | 6/1939 | Jeffreys et al. .................... 354/80 |
| 2,298,992 | 10/1942 | Warmisham et al. .............. 354/75 X |
| 2,428,273 | 9/1947 | Finnegan et al. .................. 354/75 X |
| 2,981,147 | 4/1961 | Carter et al. ...................... 354/80 |
| 3,141,393 | 7/1964 | Platt ................................... 354/81 |
| 3,176,308 | 3/1965 | Jensen ............................... 346/107 R |
| 3,395,612 | 8/1968 | Serratoni et al. ................. 354/76 X |

Primary Examiner—John Gonzales
Attorney, Agent, or Firm—Haseltine, Lake & Waters

[57] ABSTRACT

Apparatus for photo-recording road ruts comprising projecting a beam of light having a linear boundary between bright and dark portions from a light projector onto a road surface in the transverse direction of the road, and photographing the boundary portion in a camera from a position having a predetermined angular relation with the light projector. The projector and camera can be mounted on a vehicle such that the camera is at the predetermined angular position in relation to the light projector. A detecting device on the vehicle for detecting vehicular travel over a fixed distance can serve to operate the projector and the camera synchronously.

3 Claims, 7 Drawing Figures

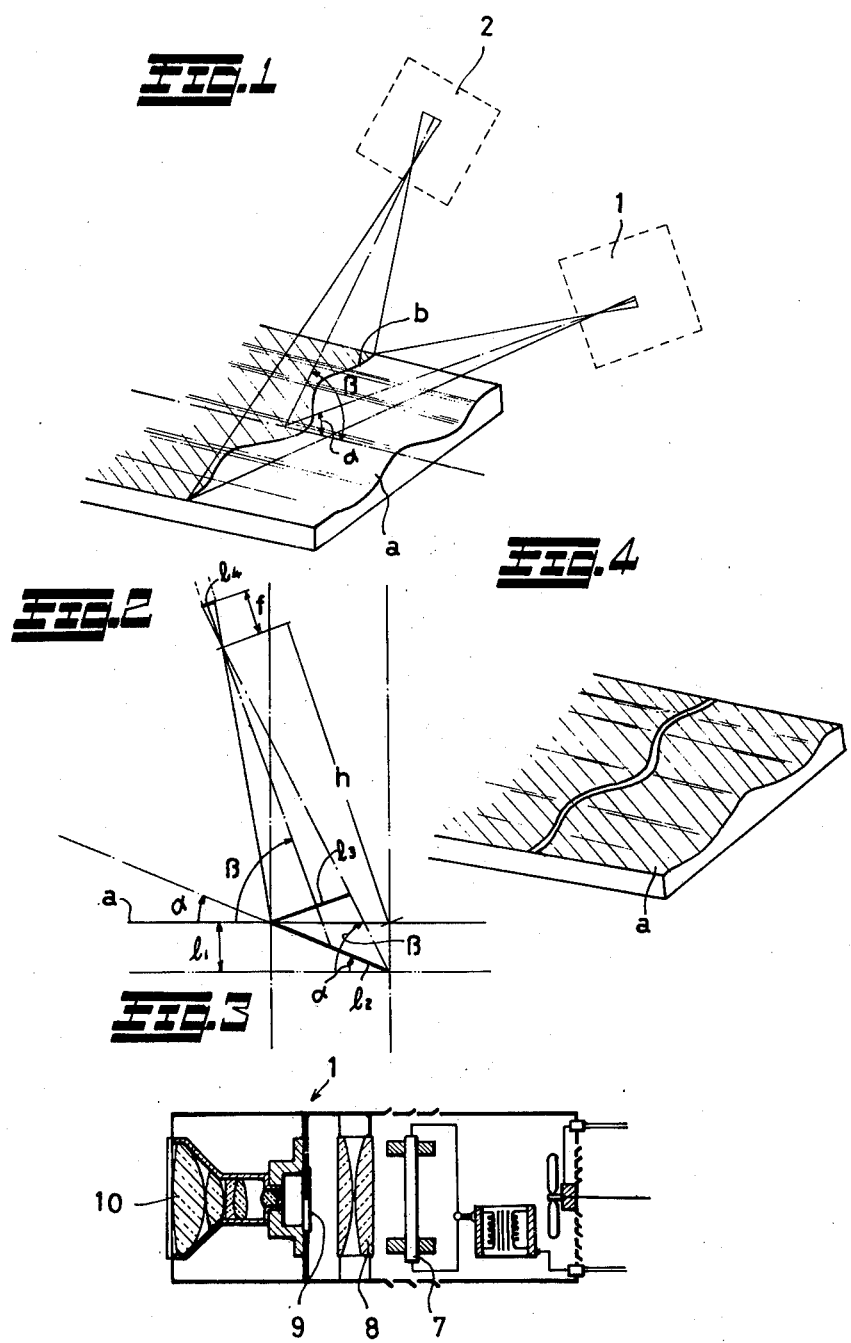

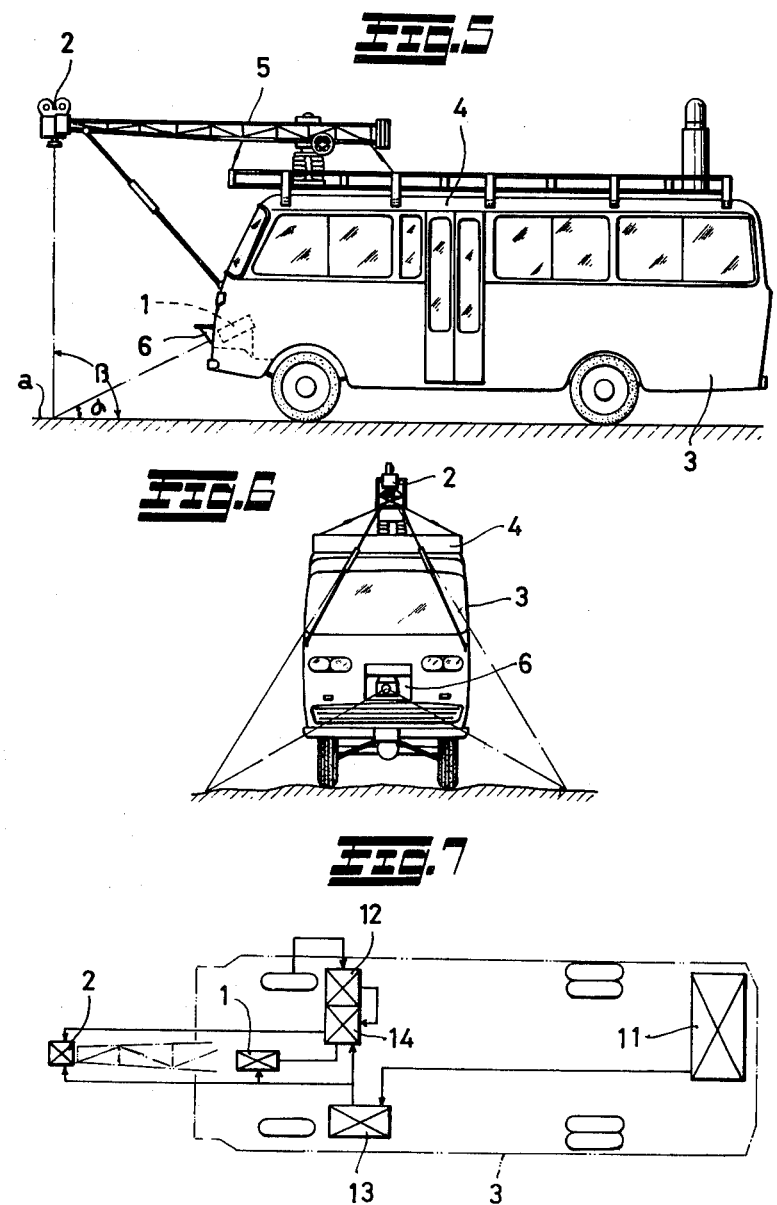

APPARATUS FOR PHOTOGRAPHING ROAD RUTS

FIELD OF THE INVENTION

This invention relates to apparatus for photo-recording road ruts.

BACKGROUND

The permissable wheel loads on a paved road surface have been steadily increased over the years resulting in damage to the road such as unevenness, cracks and the like and accurate investigation and collection of data relating to such road surface conditions is now urgently desired. Among various road conditions, a groove caused by a vehicle wheel, which is called a road "rut", is especially important, and to survey the same quantitatively to take immediate proper corrective action has now become an important problem in view of traffic safety, especially for highways and main roads.

A process for surveying road ruts is known in which a profile meter of from 3 to 4 meters in length, or a ruler is placed on a road in the transverse direction thereof while traffic is stopped, and the height from a base line previously set on the profile meter to the road surface is recorded by direct reading at respective measuring points provided at intervals of 10 cms or so in the transverse direction. The rut dimension is then calculated from the results of such recording. This conventional process necessitates the suspension of traffic on the road over a distance of about several hundred meters, and hence its implementation is disadvantageous from the view point of traffic hindrance, especially for roads which have large traffic volumes both day and night.

SUMMARY OF THE INVENTION

An object of the invention is to provide apparatus whereby the condition of ruts can be easily and rapidly recorded without interfering with normal road traffic.

According to the invention, there is provided apparatus for carrying out a process for photo-recording a road rut characterized in that a beam of light having a linear form of bright and dark boundary portions is projected from a light projecting means onto a road in the transverse direction of the road, and the bright and dark boundary portion projected on the road by the light projecting means is recorded by photographing the same from a position having a predetermined angular relation with the light projecting means.

According to another aspect of this invention, the light projecting means and the photographing means are mounted on a vehicle such that the photographing means is disposed at a predetermined angular position in relation to the light projecting means.

According to a further aspect of this invention, there is provided apparatus as above which is characterized in that the vehicle is provided with a detecting means for detecting a predetermined fixed distance of the vehicle's travel so that the light projecting means and the photographing means are synchronously operated by an output signal from the detecting means.

BRIEF DESCRIPTION OF THE DRAWING

FIG. 1 is a diagrammatic perspective view showing photo-recording of a road surface according to the invention;

FIG. 2 is a side elevational view of the photo-recording operation in FIG. 1;

FIG. 3 is a sectional side view of a light projecting means used in the photo-recording process;

FIG. 4 is a diagrammatic illustration showing a narrow beam of light projected onto a road according to the invention;

FIG. 5 is a side elevation view of one embodiment of apparatus for carrying out the method of the invention;

FIG. 6 is a front elevation view thereof; and

FIG. 7 is a block diagram of a control mechanism of the apparatus of the invention.

DETAILED DESCRIPTION

Referring to the drawings, numeral 1 denotes a light projecting device which projects onto a road surface a beam of light having a linear form of a boundary $b$ between illuminated and non-illuminated portions (bright and dark portions) extending in the transverse direction of the road, and numeral 2 denotes a photographing device or camera which photographs an image of the boundary portion from a position having a predetermined angle with respect to the light projecting device 1.

If there is a rut in the road surface, the boundary portion $b$ formed by the light projecting from the light projecting device 1 onto the road surface $a$ is presented as a curved line whose degree of curvature is proportional to the rut dimension, as shown in FIG. 1, when observed from a direction having a predetermined angular relation with the direction of light projection from the light projecting device 1. Accordingly, if the illuminated zone is photographed by the camera 2 from a position having a predetermined angular relation with the light projecting direction from the light projecting device 1, the rut is recorded in the form of a curved line.

The size of the rut can be calculated from the photographed curved line as follows:

It is now assumed that, as shown in FIG. 2, the angle between the road surface $a$ and the light beam from the light projecting device 1 is $\alpha$, the angle between the road surface $a$ and the axis of the camera 2 is $\beta$, the focal distance of the lens in the camera 2 is $f$, the photographing distance is $h$, the actual depth dimension of the rut is $l_1$, and the rut dimension in the direction of the projected light beam appears to be $l_2$. When the rut is photographed by the camera 2, the rut dimension $l_2$, that is, the curved degree of the curved line appears as $l_3$, and the same is recorded on the photographic film as follows:

$$l_4 = l_3 \cdot f/h \quad (1)$$

From FIG. 2, there are obtained the following relations:

$$l_2 = l_1 / \sin \alpha \quad (2)$$

$$l_3 \approx l_2 \cdot \sin(\beta - \alpha) \quad (3)$$

Accordingly, if expression (2) is substituted in expression (3), $$l_3 \approx [\sin(\beta - \alpha)/\sin\alpha] \cdot l_1 \quad (4)$$

If, then, expression (4) is substituted in expression (1), $$l_4 \approx f/h \cdot [\sin(\beta - \alpha)/\sin\alpha] \cdot l_1 \quad (5)$$

and from this expression (5)

$$l_1 \approx h/f \cdot [\sin\alpha/\sin(\beta - \alpha)] \cdot l_4 \quad (6)$$

Accordingly, if it is now assumed that $\beta$ is 90°, expression (6) becomes $$l_1 \approx h/f[\sin \alpha/\sin(90° - \alpha)] l_4 = h/f(\sin \alpha/\cos \alpha)$$
$$l_4 = h/f \tan \alpha \cdot l_4$$

The details of the light projecting device 1 are, for instance, as shown in FIG. 3. Namely, the device 1 is so constructed that between a condenser lens 8 provided in front of a light source 7, which comprises a lamp, and a projection lens 10, there is interposed a shading plate 9 so that the light beam emitted from the light source 7 may be partly shaded by the shading plate 9 for providing the linear form of the boundary portion $b$ between the illuminated and non-illuminated portions. The light source 7 is preferably a flash lamp with a condenser and the photographing device 2 is preferably a conventional photographic camera with a shutter.

The shading plate 9 may be modified to have a slit opening. In this case, the light beam is in the strip form as shown in FIG. 4.

FIGS. 5 and 6 show an apparatus in which the light projecting device 1 and the photographing device 2 are mounted on a vehicle 3, such as, a motorcar so that recording of the rut may be effected continuously or intermittently at regular intervals in the longitudinal direction of the road surface $a$.

More in detail, as shown clearly in FIGS. 5 and 6, the photographing device 2 is attached to the front end of a crane 5 provided on the roof 4 of the vehicle 3. The vehicle can travel at a speed of, for instance, 0 to 50 Kms/Hr. The light projecting device 1 is provided at the interior of the vehicle 3 so that the light may be projected forwards through a front window opening 6.

In order that the recording can be effected automatically at regular spaced intervals, the vehicle 3 is provided with a control mechanism as shown in FIG. 7, for operating the foregoing two means 1,2 and accessory means thereof.

In FIG. 7, numeral 11 denotes an electric generator serving as an electric power source for operating all the foregoing means, numeral 12 denotes a detecting means which detects a predetermined fixed travel distance of the vehicle at which time it generates a corresponding output pulse signal, numeral 13 denotes a panel board for distributing electric voltage and electric current suitable for each means, and numeral 14 denotes a control means which actuates the light projecting means 1 and the photograph means 2 in synchronism with the output signal from the detecting means 12. Thus, when the vehicle 3 has traveled a predetermined fixed distance, the two means 1,2 are synchronously operated to effect the desired recording.

Thus, according to this invention, by simply projecting a beam of light from a projector onto a road surface to form a linear boundary between an illuminated and a non-illuminated portion and photographing the projected light beam by a photographing means, the rut dimension can be easily recorded as a proportionally curved line.

According to a feature of this invention, the light projecting means and the photographing means are mounted on the vehicle, so that such recording can be easily effected at any desired position on the road during travel of the vehicle. According to a further feature of the invention, such recording can be automatically effected at regularly spaced intervals.

What is claimed is:

1. Apparatus for photographing a road surface to evaluate the presence of ruts therein, said apparatus comprising a vehicle adapted for traveling along a road whose surface is to be evaluated for ruts, light projecting means on said vehicle for projecting a beam of light on the road surface to form a linear boundary between an illuminated and a non-illuminated portion of the road extending transversely thereof, said light projecting means being oriented on said vehicle to direct said beam of light onto said road at an acute angle thereto and camera means on said vehicle for photographing said boundary, said camera means being mounted on said vehicle such that the axis of the camera is perpendicular to the road surface and is at a predetermined angular position in relation to said light projecting means, said light projecting means comprising a light source including a flash lamp, a condensor lens in front of said flash lamp, a projection lens in front of said condensor lens and a shading plate interposed between said condensor lens and said projection lens, said shading plate including one portion opaque to the light source and another portion pervious to the light source.

2. Apparatus as claimed in claim 1 comprising means on said vehicle for operating said light projecting means and said camera means in synchronism after the vehicle has traveled predetermined distances along said road.

3. Apparatus as claimed in claim 2 wherein said means for synchronously operating the light projecting means and the camera means comprises detecting means for determining the travel of said vehicle along said predetermined distances on the road, said detecting means being connected to the light projecting means and camera means.

* * * * *